United States Patent [19]

Cromwell

[11] E Re. 31,028

[45] Reissued Sep. 14, 1982

[54] METHOD FOR PROCESSING DROSS

[75] Inventor: Paul J. Cromwell, Williamsville, N.Y.

[73] Assignee: Cromwell Metals, Inc., Buffalo, N.Y.

[21] Appl. No.: 208,722

[22] Filed: Nov. 20, 1980

Related U.S. Patent Documents

Reissue of:

[64] Patent No.: 4,126,673
Issued: Nov. 21, 1978
Appl. No.: 902,481
Filed: May 8, 1978

U.S. Applications:

[63] Continuation-in-part of Ser. No. 796,729, May 13, 1977, abandoned.

[51] Int. Cl.[3] ..... B02C 23/14

[52] U.S. Cl. ..... 241/14; 241/24; 241/29

[58] Field of Search ..... 241/3, 14, 24, 25, 29, 241/30, 73, 76, 194, 195

[56] References Cited

U.S. PATENT DOCUMENTS

| | | | |
|---|---|---|---|
| 1,713,507 | 5/1929 | Ammon | 241/73 |
| 1,841,355 | 1/1932 | Bowen | 241/195 |
| 2,047,345 | 7/1936 | Weis | 252/1 X |
| 2,877,954 | 3/1959 | Myers | 241/24 |
| 2,971,703 | 2/1961 | Rath | 241/14 |
| 3,207,304 | 9/1965 | Thom | 209/9 |
| 3,367,584 | 2/1968 | Steinberg | 241/195 |
| 3,765,881 | 10/1973 | Scholpp | 241/3 |
| 3,770,424 | 11/1973 | Floyd et al. | 241/24 X |
| 3,912,174 | 10/1975 | Karpinski et al. | 241/24 |
| 3,999,980 | 12/1976 | Montagna | 75/68 |
| 4,046,323 | 9/1977 | McKerrow et al. | 241/24 X |

FOREIGN PATENT DOCUMENTS

| | | |
|---|---|---|
| 1195174 | 11/1959 | France . |
| 43-22495 | 9/1968 | Japan . |
| 52-31916 | 3/1977 | Japan . |
| 166936 | 4/1959 | Sweden . |

OTHER PUBLICATIONS

Garst et al., "The Recovery of Metal and Other Valuable Products from Aluminum Dross", Bur. of Mines Report of Investigations 3874, pp. 1-6 (1946).

K. Schneider, "Die Verhuttung von Aluminium Schrott", 2nd Edition, 1957, pp. 62-63.

L. I. Baron et al., "Milling of Selected Aluminum Dross", "Non-Ferrous Metals , No. 2, 1969, p. 89.

V. D. Jones, "Basic Powder Metallurgy, Production of Metal Powder", Trans. from English M., 1964, pp. 177-178.

Perry's Chemical Handbook, Fourth Ed., pp. 8-45 (1963).

*Primary Examiner*—Howard N. Goldberg
*Attorney, Agent, or Firm*—Hosier, Niro & Daleiden

[57] ABSTRACT

The invention relates to the recovering of free metal entrained in dross or skimmings obtained from melts of aluminum and aluminum based alloys wherein the dross has been partially prepared by prior art preparation processes. The invention is directed to the cleaning and preparation of the dross by the more effective removal of substantial portions of the oxide coatings on the dross. This results in the recovery of a significantly higher proportion of the free metal contained in the dross than is recovered using prior art cleaning and recovery processes. The dross, as partially processed by prior art methods, is sequentially fed through selected mechanical rolling and milling stages so as to separate aluminum oxide dust and aluminum concentrates from one another. The aluminum concentrates may be utilized in conventional furnace recovery methods to produce aluminum ingot or may be further processed through selected stages to produce high quality aluminum pellets.

43 Claims, 13 Drawing Figures

METHOD FOR PROCESSING DROSS

Matter enclosed in heavy brackets [ ] appears in the original patent but forms no part of this reissue specification; matter printed in italics indicates the additions made by reissue.

CROSS REFERENCE TO A RELATED APPLICATION

This application is a continuation-in-part of my pending application Ser. No. 796,729 entitled METHOD AND APPARATUS FOR PROCESSING DROSS filed May 13, 1977 now abandoned.

BACKGROUND OF THE INVENTION

This invention relates generally to the recovering of the free metal entrained in dross or skimmings obtained from the production of aluminum or aluminum based alloys.

In the course of conventional aluminum melting operations, oxides, nitrides and other non-metallic impurities accumulate on the surface of the molten metal. Prior to tapping of the molten metal these non-metallics are removed or skimmed from the surface of the melt. Substantial quantities of aluminum metal will be unavoidably entrained with the non-metallics and also be removed with the non-metallics. This mixture of non-metallics, free aluminum and aluminum alloy is termed aluminous dross or skim. For convenience, this mixture of non-metallics and free aluminum or aluminum alloy will hereinafter, in the specification and the appended claims, be referred to as dross.

As stated above, the dross derived from aluminous metal melt unavoidably contains a subtantial proportion of free metal and/or alloy as a result of the usual stirring of the melt and raking off of the floating material. During the raking, skimming and removal of the dross from the top of the metal melt, the dross becomes compresed into pasty mud-like masses. These masses of dross, when removed from the furnace will vary from small lumps on the order to one inch in dimension and smaller to large lumps approaching one foot in dimension for example. The amount of free metal and/or alloy in the dross may vary from 30% to 95% by weight depending upon a number of factors, such as the composition of an alloy being melted, the melting procedure followed, and the care with which the dross is skimmed or raked from the melt. If a batch of hot dross removed from a melt is allowed to stand, some free metal will accumulate at the bottom of the mass, but the larger part of the free metal will remain intimately mixed with non-metallics in the form of globules or small particles and will not readily separate from the non-metallic portion. Also, upon being exposed to the atmosphere, the hot dross may begin to react with the air, if the reaction has not already started within the furnace; and if the reaction is not stopped, a large part of the available metal will be lost. The separation of the free metal from the non-metallic portion of the dross has been a difficult problem. Several methods used or proposed for effecting separation are mentioned below.

In one method, the dross is cooled to room temperature as quickly as possible, screened, crushed as in a ball mill, and then screened again. By this mechanical means of separation, the coarser metal particles can be separated and recovered. However, the bulk of the free metal in the dross is in the form of small particles which heretofore has made recovery by mechanical means unattractive.

In another method the hot dross is stirred into a heel of molten aluminum or aluminum alloy. This method is not efficient because in agitating the dross in the molten metal heel, nearly as much metal is beaten into the dross as is removed.

In still another process, after skimming of the dross, it is fed without further preparation into recovery furnaces, fluxed with salt for example, and metal recoveries are obtained. This process is not efficient because of low metal recoveries, high energy costs per pound of metal recovered and a serious disposal problem of the resulting slag which, because of its salt content, has become environmentally unacceptable.

Common salt, i.e. sodium chloride, is employed in this process due to the low cost of the material. More expensive salt type fluxes may be used to increase metal recovery to a limited extent, but then such additional cost for flux offsets the increased effectiveness related thereto. However, while the cost of sodium chloride is low, the recovery of molten metal involved has also been very low. These low recoveries are due to the fact that common salt fails to efficiently attack the oxide coatings on the small droplets of aluminum material entrapped in the aluminous dross. The use of common salt has a further disadvantage in that substantial heat is required to melt the salt, its melting point being at a temperature of approximately 800° C. (approximately 1480° F.). If satisfactory melting is to be made possible, the salt bath must be heated at a temperature substantially above its melting point in order to have sufficient fluidity, and it must be kept at this temperature during the introduction of the aluminous dross and during melting down. For example, where the salt melts at 1480° F., the bath would have to be heated to a temperature on the order of 80° F. higher, or about 1560° F. in this instance. For melting and treating aluminum, the maximum temperature permissible for best results is approximately 1500° F. Above this temperature deterioration of the quality of the metal and undesirable fumes result. Furthermore, when the aluminous dross-salt flux mixture is heated to 1560° F., it possesses a considerable dissolving power for all metals which come into consideration as impurities. In addition, the hot common salt melt strongly attacks furance lining.

According to a more recent process, hot dross, which may be either the dross as removed from the melting furnace or cold dross which has been reheated, is placed in an inclined rotatable drum open to the air, and the dross is rotated therein for a short period of time. If the dross is not already burning when introduced into the drum, ignition is started by the addition of suitable salts. In this process, a portion of the finely divided free metal is consumed in reacting with the air to provide the heat essential for raising the temperature of the mass. Consequently, the recovery of metals is not as high as desired. Metal recoveries on the order of 65% to 70% of the available metal have been achieved by this method, but on the average the recovery has been found to be below 60%. In addition, it is difficult to control the furnace temperature when employing this process, and generally the temperature is well above 1500° F. with the attendant disadvantages thereof.

With respect to all of the prior art methods for recovering aluminum metal, it is to be understood that dross, as generally referred to hereinabove, exists in particles and chunks of material of various sizes. A represenative sample of dross, after initial conventional milling and screening preparation, may contain the following size ranges, aluminum content and recoverable aluminum using the better of the recovery methods described heretofore:

| Size Range | % of Dross Load | Approximate Metallic Content | Approximate Furnace Recovery of Metallic as % of Dross | Approximate Furnace Recovery of Metallic as % of Entrained Metallics |
|---|---|---|---|---|
| +1 inch | 10% | 90% | 81% | 90% |
| −1 inch +.5 inch | 12% | 85% | 68% | 80% |
| −.5 inch +.25 inch | 13% | 80% | 56% | 70% |
| −.25 inch +.10 inch | 15% | 75% | 38% | 50% |
| −.10 inch | 50% | 45% | N/A | N/A |

The size ranges of −0.10 inch and down, if subjected to the heat of the furance, would be consumed in the heat of the furnace and lost. Therefore, these size ranges are generally screened off and sold as low percentage metallic content aluminum oxide dust.

Using a representative sample of dross, screening off the −0.10 inch size range, and using the balance for furnace recovery, the following approximate results are obtained using the generally accepted aluminum recovery methods described heretofore.

| Size Range | Pounds to Furnace | Pounds Contained Metallics | At Metallic % | Pounds Recovered Alloyed Aluminum Ingot | Metallics Recovered as % of Dross | Metallics Recovered as % of Entrained Metallics |
|---|---|---|---|---|---|---|
| +1 inch | 20,000 | 18,000 | 90% | 16,200 | 81% | 90% |
| −1 inch +.5 inch | 24,000 | 20,400 | 85% | 16,320 | 68% | 80% |
| −.5 inch +.25 inch | 26,000 | 20,800 | 80% | 14,560 | 56% | 70% |
| −.25 inch +.10 inch | 30,000 | 22,500 | 75% | 11,250 | 38% | 50% |
| | 100,000 | 81,700 | 82% | 58,330 | 58% | 71% |

Therefore, using prior art methods of metallic recovery, substantial portions of the contained aluminum or aluminum alloy in the low grade, smaller dross particles are lost in the recovery process. This results in a metal recovery, by weight, of approximately 58% of the dross load or approximately 71% of the contained metallics.

It is to be further understood that conventional prior art milling methods could be employed to mill dross for an extended period of time with the resulting dross having an increased metallic % content. However, this is not done for at least two reasons. First, it would require significant amounts of energy to mill the dross for prolonged periods of time which is economically impractical. Secondly, if the dross were continuously milled for a prolonged period of time, the milling would tend to disintegrate some of the metal into dust which would combine with the oxides whereby such disintegrated metal could not be used to charge a furnace.

Therefore, with respect to the current state of the art, it will become readily apparent that the present invention represents a significant breakthrough in the processing of dross as hereinafter shown.

Accordingly, one object of the present invention is to provide a new and substantially improved process for recovering a larger portion of the entrained aluminum from dross which heretofore has been done with lesser effectiveness due to the difficulties in effectively processing the same.

Another object of the present invention is to provide a new and improved dross processing method whereby low percentage metallic content aluminum oxide dust may be recovered for use in various industrial applications.

A principal object of the present invention is to provide a method wherein aluminum concentrates of selected degree are mechanically recovered from partially prepared low grade dross concentrates.

Another object of the present invention is to produce very high percentage recoveries of aluminum entrained in dross, as aluminum ingot, using conventional prior art furnaces and the present invention.

A further object of the present invention is to recover aluminum entrained in dross at a lower cost of recovery than methods now in use by reducing the amount of fluxing materials needed and by maximizing energy and labor resources, which results in minimizing the energy and labor cost per pound of aluminum produced in the furnace, and by reducing waste disposal problems.

Still another object of the present invention is to provide a new dross processing method whereby high purity aluminum pellets may be recovered for use in various industrial applications.

Another object of the present invention is to reduce the amount of waste created and air pollution problems created in prior art recovery processes; thereby significantly reducing environmental problems.

Another object of the invention is to convert irregularly sized chunks of a metallic dross or similar material, having a predetermined size range into metallic pellets or powder comprising particles having a predetermined size range.

In summary, raw dross may initially be screened, milled, screened and separated into three fractions, for example, as familiar to those skilled in the art. The particles of these fractions may be one-quarter of an inch and larger, one-quarter of an inch down to one-tenth of an inch and one-tenth of an inch and down in size. This initial preparation and sizing is prior art and not part of the present invention.

Dross concentrates or particles larger than one inch, for example, which approximates 20% of a representative sample of partially prepared dross concentrates, are already high grade, high % metallic concentrates to a degree sufficient for final processing. The size ranges on the order to one inch and smaller are sub-divided and processed by the method and apparatus of the instant invention.

A sub-divided size range, low grade dross concentrate is screened and conveyed to a first pair of roller means having a predetermined spacing. The rollers are preferably spring or otherwise resiliently mounted to allow movement of the rollers away from one another as the dross passes therebetween. The rollers compress the dross particles or concentrates to a limited degree without substantially crushing the same so as to break the bonds between the metalic and non-metallic substances in the dross. The dross concentrates, so compressed, are screened to remove the limited amount of oxides which fall off as a result of the roller action. The screened dross, in the compressed condition, is then conveyed to a hammermill which loosens and removes the oxides from the aluminum in a highly effective manner due to the prior breaking of the bonds between the metallic and oxide substances by the rollers. The oxides are then screened out to yield aluminum concentrates significantly free of oxides. These resulting concentrates may be charged into a recovery furnace or conveyed to a second pair of roller means. The second pair of rollers substantially crush the high grade aluminum concentrates into flattened high grade aluminum flakes. A small percentage of oxide material is removed by the action of the second rollers.

At this point, the aluminum flakes may be further processed as follows:

1. The flakes may be charged into a furnace for recovery of the contained metal as aluminum ingot with recovery ratios being approximately the same as partially prepared dross concentrates sized larger than one inch in dimension.

2. The aluminum flakes may be processed through a series of hammermills to convert the same into high purity aluminum pellets sized on the order to one-tenth of an inch and smaller, for example. The larger shredded pieces tend to ball up into substantially pure aluminum pellets. The smaller shredded pieces also tend to ball up into aluminum pellets, but of lesser purity because they become intermixed with tiny pieces of oxide not removed by the process.

3. The substantially pure aluminum pellets may be charged into a furnace for recovery of the contained metal as aluminum ingot with recovery ratios better than the recovery ratio of partially prepared dross concentrates sized larger than one inch as referred to hereinabove.

The foregoing and other objects, advantages and characterizing features of the present invention will become clearly apparent from the ensuing detailed description and an illustrative embodiment thereof, taken together with the accompanying drawings wherein like referenced characters denote like parts throughout the various views.

DETAILED DESCRIPTION OF THE INVENTION

Figures 1A, 2A, 2B, 3A, 3B, 4A, 4B:
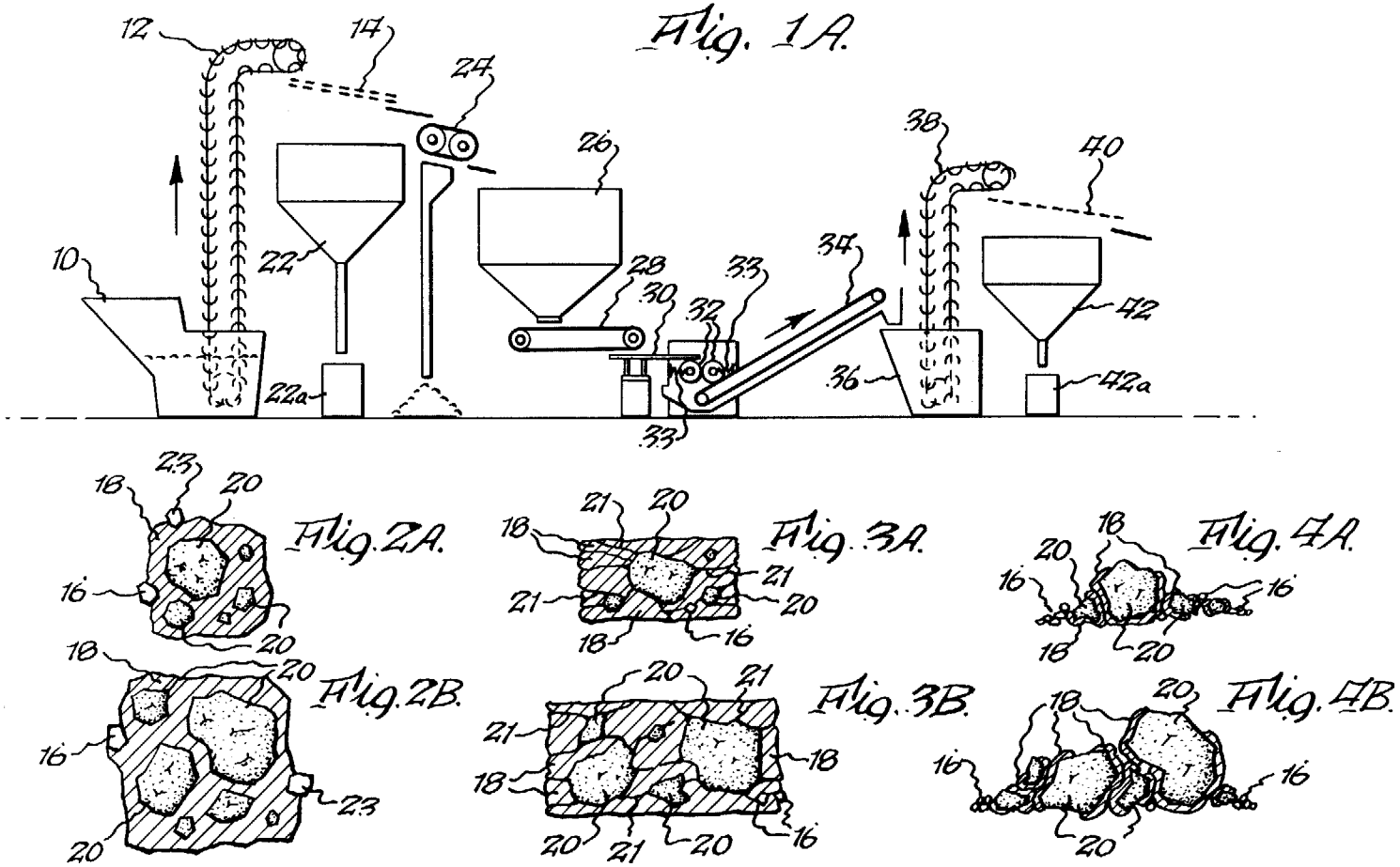
FIGS. 1A and 1B schematically represent exemplary apparatus employed in practicing the present invention to recover aluminum metal from dross wherein the dross is fed into a conveying means at the left side of FIG. 1A and the recovered products are received at the right-hand side of FIG. 1B.
FIGS. 2A and 2B respectively represent a chunk of dross, previously milled and sized by prior art methods, on the order of one-quarter to three-quarters of an inch in dimension and having on the order respectively of 65% and 75% by weight of aluminum metal combined with non-aluminum materials such as ferrous and oxide substances.
FIGS. 3A and 3B are views correspondingly similar to FIGS. 2A and 2B representing the dross after it has passed through the first pair of roller means whereby the bonds between the metal and oxides are substantially broken.
FIGS. 4A and 4B correspondingly represent aluminum concentrates and non-aluminum dust substances separated therefrom after the dross has passed through the first pair of roller means and hammer mill associated therewith.

In considering a detailed description of an embodiment of the method comprising in part the present invention it is to be understood that the non-aluminum, oxide dust in combination with varying degrees of aluminum dust recovered from the dross has a substantial market value, as for example in the exothermic industry as it relates to the manufacture of steel. The aluminum dust entrained in the non-aluminum substances is subject to oxidation and correspondingly is a source of considerable heat necessary in the manufacture of steel, all of which is well known to those skilled in the art. As energy in general becomes more expensive, it will become still more desirable in the steel industry to improve the quality of manufactured steel with a view towards avoidance of reprocessing steel products which can be costly in an energy sense. This represents but one of the uses for the aluminum/oxide dust provided by the present invention and illustrates the importance thereof in view of current and potential future energy problems. Of course, the value of recovering aluminum concentrates from the dross in selective degrees of purity by a mechanical process is readily apparent to all familiar with this art.

Dross as such, which is intended to include aluminum, aluminum alloys and other similar metals, may be purchased by a dross processor from a metal producer wherein the dross will have particles or chunks of very small size to chunks sized on the order of one foot in dimension, for example. By way of example, a one hundred thousand pound load of raw aluminum dross may contain on the order of 75% to 80% by weight of metallic aluminum combined with non-aluminum substances. The relatively larger chunks of dross generally contain a higher percentage by weight of aluminum metal than the smaller chunks and for purposes of description aluminum is considered to mean pure aluminum as well as aluminum alloy. Dross chunks on the order of two inches in dimension and larger may accordingly be feasibly processed for metal recovery in furnaces employing prior art procedures and the present invention is of less significance with respect to dross chunks of this size than with respect to those on the order of two inches in dimension and smaller. In other words, the relatively smaller amount of oxide on the larger, high metallic content dross chunks creates a lesser problem in recovering the metal therefrom. However, as discussed and to be discussed, as the size of the dross chunks decrease, it becomes progressively more difficult to process the same for recovery in a furnace. The smaller the dross chunk becomes, it has a relatively larger surface area. The relatively larger surface area subjects the smaller concentrates to destruction in the heat of the furnace. The smaller the dross chunk becomes, its relative non-metallic oxide coating increases entraining a a relatively smaller percent of metal within the concentrate. In this regard, the oxides act to ensulate the entrained aluminum and salt fluxes have less efficiency in attacking the oxide coatings and consequently less of the entrained metal is released. Also, because of their lower density, a good portion of the released metal from the smaller dross chunks are now subject to being burned up in the heat of the furnace. Accordingly, as referred to above, the prior art methods of recovering metal from dross chunks particularly in the size range on the order of two inches in dimension and smaller have not been efficient—recovering for example on the order of 90% of the entrained metal in sizes near two inches if properly prepared to only less than half of the entrained metals in sizes near one tenth of an inch. Therefore, the method to be described, although applicable in general to metallic dross, is specifically applicable to aluminum dross chunks or particles of smaller size.

Turning now to FIG. 1A, dross which has been previously milled and screened from whole dross into particle sizes ranging for example from one-tenth of an inch to one-quarter of an inch are placed in hopper 10 and conveyed upwardly by a bucket elevator 12 to a double deck screen 14. It is to be understood that the instant method is more efficient when the dross charged into hopper 10 has been appropriately sized into selected size ranges. With respect to dross particles 2 inches in dimension and smaller, the size ranges of dross for charging into hopper 10 could include 1/40 to 1/20 of an inch in dimension, 1/20 to 1/10 of an inch, 1/10 to ¼ of an inch, ¼ to ½ of an inch, ½ to 1 inch, 1 to 1½ inches and 1½ to 2 inches. Of course these ranges could be varied somewhat within the scope of the invention. As shown in FIGS. 2A and 2B, a typical particle or chunk of dross will include metallic particles 20 oxide substances 18, ferrous substances 16 and other foreign substances 23.

FIGS. 2B, 3B and 4B are included only to illustrate the larger percentage of metal in larger dross particles when compared to FIGS. 2A, 3A and 4A. For example, FIG. 2A may represent metal content on the order of 65% for a one-quarter inch particle while FIG. 2B may represent metal content on the order of 75% for a three-quarter inch particle.

Oxide and aluminum dust having particles smaller than one-twentieth of an inch for example pass downwardly through the double deck screen 14 into hopper 22 and are collected as an end product for uses referred to hereinabove. In referring to the separation of non-metallic substances from metallic substances/concentrates, it is to be understood that minute particles of metal substantially in the form of dust, will be commingled with the non-metallic substances which also will be of minute particulate size. Necessarily, the dust collected in hopper 22 will have a varying percentage of aluminum dust commingled therein. Container 22a may simply be a removable barrel for receiving the aluminum oxide dust from hopper 22. The dross material not falling through the double deck screen 14 passes onto a magnetic separating means 24 which removes loose ferrous substances such as 16, subsequent to which the dross is conveyed to hopper 26. The dross in hopper 26 is in turn fed to a conveyor 28 which conveys the dross material to a vibrating feeder 30 which feeds the dross material to a first pair of spaced roller means 32.

The rollers 32 are preferably resiliently mounted with respect to one another as for example by means of springs 33. The rollers 32 have a predetermined spacing less than the selected size range of dross particles passed therebetween whereby the rollers 32 may resiliently separate one from the other upon passage of the dross therebetween. For example, for dross 1/10 to ¼ of an inch fed to rollers 32, the spacing therebetween could be on the order of 1/20 of an inch. The spacing would be correspondingly increased or decreased for other dross size ranges so that it is less than the smallest size of particles passed therethrough. The rollers 32 are adjusted to compress the dross passed therebetween to a limited degree without substantially crushing the dross so as to substantially break the bonds between the metallic and non-metallic substances therein. The spring pressure on the rollers, which can be adjusted independently of the spacing, should be increased or decreased respectively for the larger or small dross sizes so as to impart the above effect on the dross.

The limited compression imparted by rollers 32 can be appreciated from a comparison of FIGS. 2 and 3 respectively representing dross on the input and outputs sides of rollers 32. As illustrated in FIG. 3, breaking of the bonds between the metallic and non-metallic substances is intended to be represented in a schematic sense by the fracture lines 21. Of course oxide bonds on the surface of the aluminum particles would be broken. The limited compression imparted by rollers 32 is to be contrasted with prior art roll crushers which in good part pulverize or disintegrate dross passed therebetween. In so doing, the oxide substances such as 18 become ground into the metallic substances so that they are not readily separable therefrom upon subsequent milling as are the oxides subjected to the limited compression of the instant method. In this regard, the springs 32 function to avoid imparting undue compression on the dross passed through the rollers. However, it is within the scope of this invention that rollers 32 could have fixed mountings with respect to one another, thereby not being resiliently separable. In this arrangement, the oversizing of the dross passed between the rollers would have to be restricted to a narrower range so as to insure that only an appropriate amount of compression and impaction be imparted to the dross.

Figure 1B:
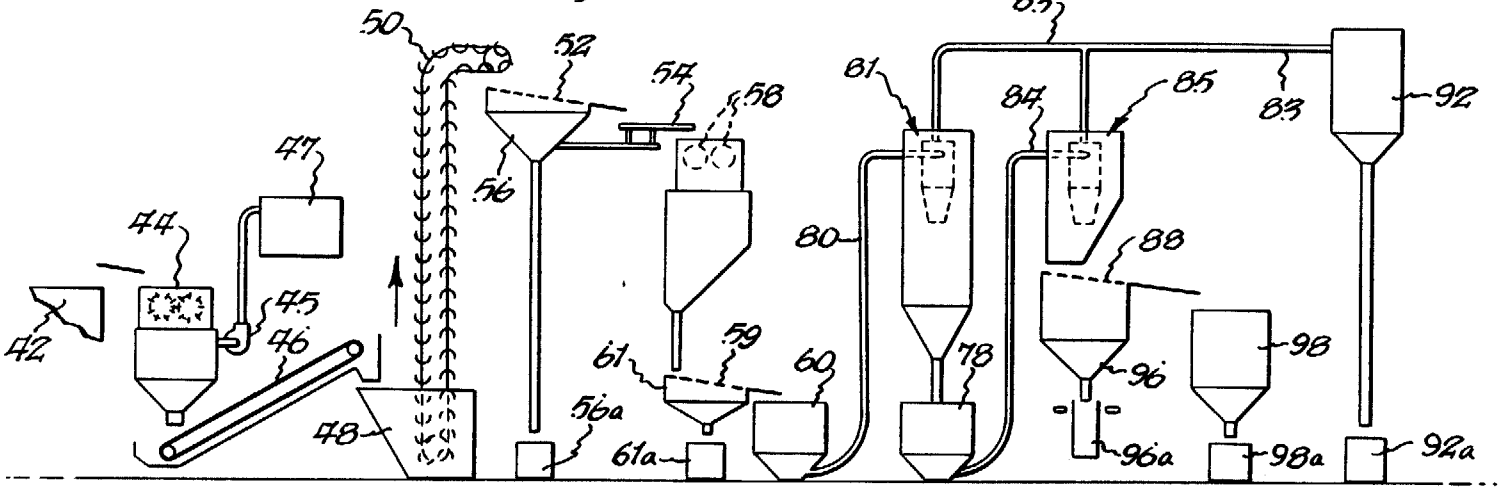

The crushed dross flows from the rollers 32 up an inclined conveyor means 34 to hopper 36 which feeds a bucket elevator 38. The bucket elevator 38 feeds the dross onto a single deck vibrating screen 40 which screens out non-aluminum and aluminum dust substances in a manner similar to the collection of such substances in hopper 22 described hereinabove. The dross materials which do not fall through screen 40 into the underlying hopper 42 and container 42a are passed (FIG. 1B) to a hammer mill means 44. Hammer mill 44 is of a type well known to those skilled in the art and which impacts the dross, previously fractured to a limited degree, so as to knock off loose oxide materials. In this regard the prior compressing of the dross by rollers 32 is significant so as to enable mill 44 to disassociate the oxides from the metal after rollers 32 have broken the bonds therebetween. However, hammer mill 44 does not necessarily deform the aluminum particles and chunks, as viewed in FIG. 4, but yields particles of dross having significantly higher percentage of metal content (concentrates) with oxides completely removed in fact from some of the surface area of the metal.

An air separator or separating means 45 is in fluid communication with the lower housing of mill 44 which pulls a certain amount of non-metallic and metallic dust from the housing to a remotely located baghouse 47 for example.

The dross as processed by the hammer mill 44 (FIG. 4) falls to the underlying conveyor 46 which passes the same to hopper 48 and the bucket elevator 50 associated therewith. Bucket elevator 50 transports the chunks of aluminum concentrates and disassociated oxide materials not pulled off by air separator 45 upwardly onto a single deck vibrating screen 52. The resulting relatively high metallic concentrates may be passed to another magnetic separator (not shown) and onto vibrating feeder 54. The milled non-metallic substances as well as minute aluminum particles which may be present fall through screen 52 into hopper 56 as an end product, in a manner similar to that described with respect to screens 40 and 14. In actual practice, it has been found that the limited compression imparted by rollers 32 removes on the order of 7 to 8 percent of the original oxides present and at the further step of milling as at 44 for example removes a significant additional amount of non-metallic substances (oxides) on the order of 11–12 percent of the original non-metallic substances.

The dross or aluminum concentrates conveyed to vibrating feeder 54 are a marketable product, without the need for further processing, within the context of the present invention. Further processing, as within the scope of this invention, would increase the purity of the concentrates but at the cost, of course, of further processing operations. The concentrates provided at feeder 54 have been cleaned of oxides to such a degree that they may be charged into, for example, a swarf furnace for recovery of metal in ingot form, as well known in the prior art. The charging of relatively clean concentrates, as provided by the instant invention, into a swarf furnace is to be contrasted with the prior art methods of charging considerably less pure concentrates into a rotary furnace for the recovery of metal which involves all of the drawbacks referred to previously hereinabove.

Figure 5:
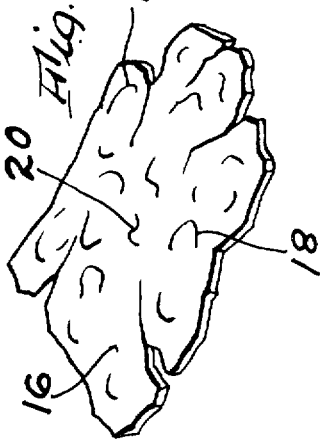
FIG. 5 illustrates aluminum concentrates after passing through the second pair of roller means wherein the concentrates have been substantially flattened.

Alternatively, the concentrates on feeder 54, instead of being taken off as an end product, may be passed to the spaced rollers 58 which deform the aluminum concentrates into flattened, flake-like pieces as illustrated in FIG. 5.

Rollers 58 preferably include fixed mountings whereby the concentrates from feeder 54 are compressed into flakes such as illustrated in FIG. 5 which may be on the order of 1/16 of an inch thick for example with respect to 1/10 to ¼ of an inch dross originating in hopper 10. The spacing of rollers 58 would be set to a corresponding degree and could be increased or decreased, respectively for larger or small dross sizes originating in hopper 10. The flakes fall to the underlying screen 59 which passes some additional aluminum and oxide dust into hopper 61 and associated container 61a.

At this point the flakes include a somewhat higher percentage metal content than the concentrates conveyed to feeder 54. Consistent with the approach of the present invention, the flakes residing on screen 59 may be pulled off as a marketable product not requiring further processing. With respect to conversion to ingot form, the flakes may be viewed as more desirable than the concentrates conveyed to feeder 54 since the flakes for example have a higher density and accordingly will sink below the surface of a swarf furnace more rapidly as a consequence. Of course, it is important that the charge to the swarf furnace (concentrates/flakes) sink below the furnace surface so as to avoid potential combustion with the atmosphere.

Figure 7:
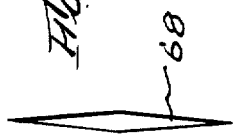
FIG. 7 is an illustration of the cutting edge of a knife associated with the mill illustrated in FIGS. 8 and 9.
Figure 9:
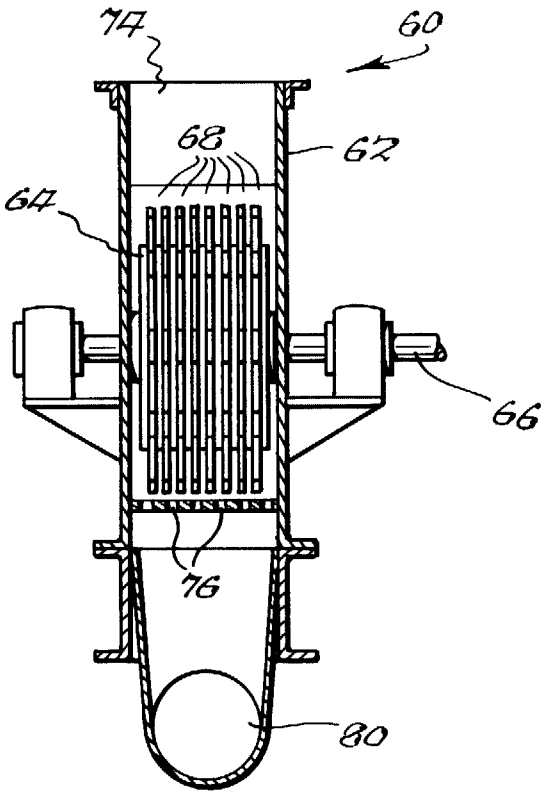
FIG. 9 is a transverse view in section taken about on line 9—9 of FIG. 8 showing the hammer mill illustrated therein.
Figure 8:
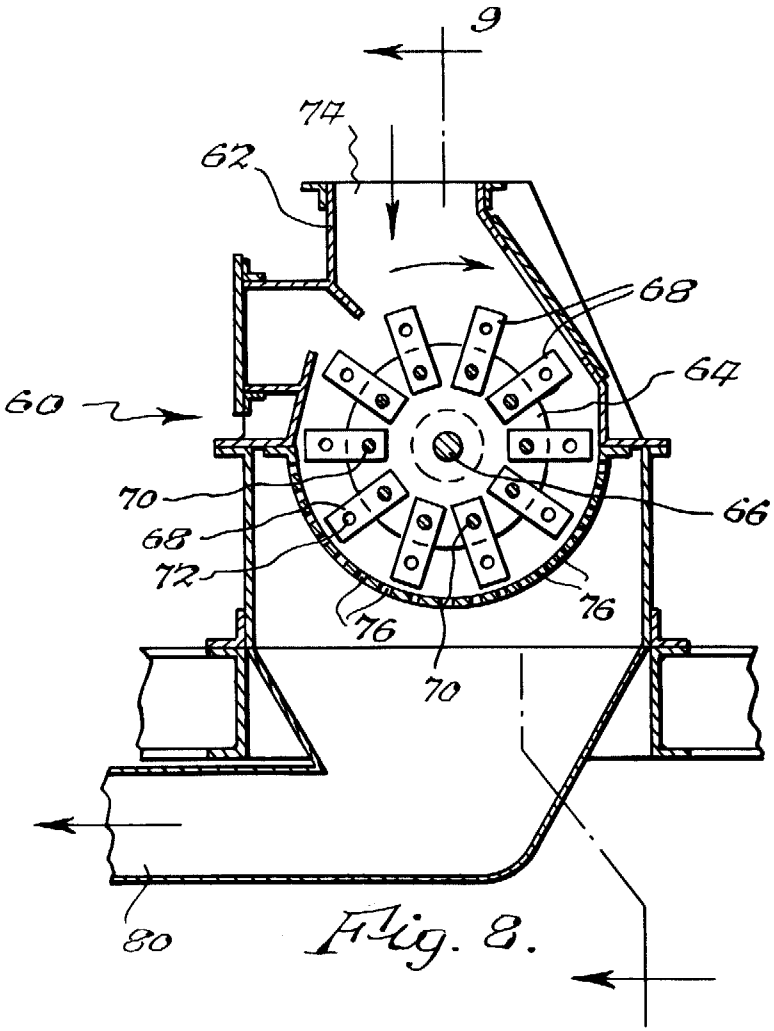
FIG. 8 is a side view of a mill, with portions thereof shown in section, for converting chunk aluminum into aluminum pellets comprising particles of a predetermined size range.

Should it be desired to convert the flakes on screen 59 to yet a more pure form, the flakes may be conveyed from screen 59 to a hammer mill 60, one embodiment of which forms part of the present invention and is illustrated in FIGS. 7–9.

The FIG. 5 flakes are processed by mill 60 and flow through passage 80 to a cyclone type of air separation means 81. Cyclone 81 is a device well known to those skilled in the art wherein the milled flakes would enter the cyclone at a tangential angle so as to create a low pressure area in the central portion of the cyclone. The low pressure draws aluminum and oxide dust into the central portion which pass in turn through conduit 83 to a remotely located baghouse 92. Baghouse 92 empties into an underlying removable container 92a which is similar to containers 61a, 56a, etc. The heavier metallic particles in cyclone separator 81 drop to a second mill 78 underlying the cyclone 81. The output from mill 78 is conveyed through passage 84 to a second cyclone means 85 which is similar in all respects to cyclone 81 and which conveys aluminum and oxide dust to conduit 83 and the baghouse 92.

Figure 6:
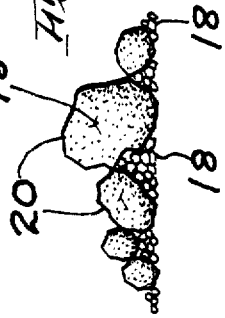
FIG. 6 represents aluminum particles after having passed through the hammer mill means following the second pair of roller means wherein the concentrates have been further cleaned.

Metallic concentrates, which may be in the form of pellets as shown in FIG. 6, fall from cyclone 85 to the underlying screen means 88. The aluminum pellets falling onto screen 88 are of a higher purity than the FIG. 5 type flakes charged into mill 60 in view of the oxides removed by cyclones 81 and 85, and further in view of the oxide, as well as aluminum dust, which passes through screen 88 to the underlying hopper 96 and container 96a. The pellets residing on screen 88 are in turn conveyed to hopper 98 and to the underlying container 98a as an end product.

The pellets or concentrates collected in container 98a are the most desirable to the various products produced by the instant invention since they are of the relatively greatest purity. Of course, the pellets in container 98a necessitate more processing than the other concentrates provided by the instant invention which are of lesser purity in correspondence to their degree of processing. Accordingly, a user of the subject invention will be able to selectively process metallic concentrates to various degrees of purity based on operating expenses and market conditions, etc.

Mills 60 and 78 may be conventional in nature, having generally blunt blades which result in the formation of spherical-like pellets as illustrated in FIG. 6.

In addition, the mills 60 and 78 may be of a type, as described hereinbelow to form part of the instant invention, which would result in the concentrates collected in hopper 98 being in a sliced, flake-like configuration.

The hammer mill 60 in FIGS. 8 and 9 includes a housing 62 and a rotary hub 64 which is mounted on shaft 66 for rotation within the housing. Shaft 66 may be driven by an electric motor for example in a clockwise direction as shown in FIG. 8. A plurality of cutting knives 68 are pivotally mounted about the periphery of hub 64 by fastening means 70.

FIG. 7 illustrates a transverse of view of a cutting knife 68 wherein the knife includes a slicing blade configuration along both of its side edges. In this regard, the cutting knives have interchangeable leading and trailing edges which can be employed to prolong the useful life of the cutting knife as will be more fully described hereinbelow. In addition, cutting knives 68 include mounting apertures 72 at both ends thereof. Through use of mounting apertures 72 either end of a cutting knife may be mounted to hub 64 in an interchangeable manner so that the useful operating life of the cutting knives can be extended. In addition, an opening 74 is provided at the top of housing 60 through which aluminum concentrates are fed to the mill. In addition, a substantial amount of air is also drawn into the mill through opening 74. The bottom portion of housing 62 includes a plurality of openings 76 of a predetermined dimension which function as a screening means to insure that the aluminum material has been sliced or milled to a certain size before passing to the subsequent mill 78 indicated in FIG. 1B.

Mill 78 is functionally equivalent to mill 60. The size of its openings 76 which may be smaller than those in mill 60 so that the aluminum concentrates or chips are further reduced in size. With respect to FIGS. 1B and 8, the milled product from mill 60 passes through the apertures 76 into the base of housing 60 and passes into a tubular passage 80 which connects with cyclone 81. Mill 60 tends to draw in a substantial amount of outside air through opening 74 which in turn results in an air flow through the base of the housing of mill 60 and through passage 80 to the cyclone 81 so as to provide a motive force to the milled aluminum. The cyclone 81 feeds the aluminum in process to mill 78 which inturn passes the further processed aluminum to passage 84. The second mill 78 functions to further induce an air flor through the cyclones and the passage 84.

In summary, it is to be understood that metallic concentrates having varying degrees of purity are selectively provided by the aforesaid method and apparatus from dross which heretofore has had a significantly lesser value in terms of aluminum metal recovery for example. The commingled oxide and aluminum dust collected at various points in the subject process, although including varying percentages of aluminum dust, are quite marketable as for example in the manufacture of steel.

The combination of processing steps provided by the first pair of rollers 32 and mill [4] *44* are fundamental in providing the metallic concentrates in progressively greater degrees of purity at selected stages in the instant method. As stated, it is preferable that rollers 32 be spring loaded so as to facilitate the imparting of a limited compression to the dross passing therebetween for the reasons set forth hereinabove. In turn, the subsequent milling action provided by mill 44 complements limited the compression imparted by rollers 32 to effectively clean the dross to a significant degree. As described, the concentrates provided on screen 52, following mill 44, are a valuable product and may be charged, for example, directly into a furnace for metal recovery in ingot form. Of course, the concentrates on screen 52 may be further cleaned to a higher degree of purity by further processing through rollers 58. In turn, the flake-like particles passing from rollers 58 to screen 59 may be considered an end product of the instant invention or the flakes on screen 59 may be subjected to further milling and separation steps to yield concentrates or pellets of yet still higher purity.

It is also within the scope of the present invention that metallic scrap material, such as aluminum turnings for example, could be fed directly to rollers 58 for conversion into aluminum chips by processing through the mill described in FIGS. 7 through 9. In this regard, it is believed that the hammer mill described in FIGS. 7 through 9 is unique in operation in view of the cutting knives 68 which tend to slice through the metallic material processed therethrough.

From the foregoing, it is apparent that the objects of the present invention have been fully accomplished. As a result of this invention a vastly improved method is provided for recovering metallic substances from dross material. Furthermore, the method may be employed to convert irregularly sized chunks of metallic scrap into milled chips having a sliced-like configuration. The method is mechanical in nature and may be employed on a production line basis. In addition, a novel and unique mill is provided for converting aluminum chunks or compressed flakes into aluminum chips of predetermined dimension.

Having thus described and illustrated my invention, it will be understood that such description and illustration is by way of example only and that such modifications and changes as may suggest themselves to those skilled in the art are intended to fall within the scope of the present invention as limited only by the appended claims.

I claim:

1. A method for reclaiming, in relatively high metallic concentrate form, metallic substances entrained in dross, said method comprising the steps of:

conveying said dross to a pair of roller means having a predetermined spacing, said dross comprising particles of a predetermined size range, compressing said dross to a limited degree without substantially crushing the same between said pair of roller means by passing said dross therebetween so as to substantially break the bonds between the metallic and non-metallic substances in said dross, milling said dross after passage thereof through said pair of roller means so as to disassociate said metallic and non-metallic substances one from the other, and separating said non-metallic substances from said metallic substances so that relatively high metallic concentrates remain whereby metallic dust-like particles become disassociated from said metallic substances and are commingled with said non-metallic substances after separation of the latter from said metallic substances.

2. The method as set forth in claim 1 wherein said metallic substances comprise aluminum.

3. The method as set forth in claim 2 including resiliently mounting said pair of roller means with respect to one another to have a predetermined spacing less than said predetermined size range of said dross particles.

4. The method as set forth in claim 3 wherein said dross conveyed to said pair of roller means comprises particles greater than 1/40 of an inch but less than 1/20 of an inch in greatest dimension.

5. The method as set forth in claim 3 including separating said non-metallic substances from said metallic substances by passing both said substances over a screen means.

6. The method as set forth in claim 5 including separating said non-metallic substances from said metallic substances by passing the same through an air separator means.

7. The method as set forth in claim 3 further including the step of removing particles smaller than a predetermined size commingled in said dross prior to passing said dross between said pair of roller means.

8. The method as set forth in claim 3 wherein substances having magnetic properties are commingled in said dross and including the step of removing the former from the latter prior to passing said dross through said pair of roller means by passing said dross over a magnetic separating means.

9. The method as set forth in claim 3 wherein said dross conveyed to said pair of roller means comprises particles greater than 1/20 of an inch but less than 1/10 of an inch in greatest dimension.

10. The method as set forth in claim 3 wherein said dross conveyed to said pair of roller means comprises particles greater than 1/10 of an inch but less than ¼ of an inch in greatest dimension.

11. The method as set forth in claim 3 wherein said dross conveyed to said pair of roller means comprises particles greater than ¼ of an inch but less than ½ of an inch in greatest dimension.

12. The method as set forth in claim 3 wherein said dross conveyed to said pair of roller means comprises particles greater than 178 of an inch but less than 1 inch in greatest dimension.

13. The method as set forth in claim 3 wherein said dross conveyed to said pair of roller means comprises particles greater than one inch but less than 1½ inches in greatest dimension.

14. The method as set forth in claim 3 wherein said dross conveyed to said pair of roller means comprises particles greater than 1½ inches but less than 2 inches in greatest dimension.

15. The method as set forth in claim 1 including resiliently mounting said pair of roller means with respect to one another to have a predetermined spacing less than said predetermined size range of said dross particles.

16. The method as set forth in claim 1 including mounting said pair of roller means in a substantially rigid manner so as to have a fixed predetermined spacing therebetween, said roller spacing being less than said predetermined size range of said dross particles.

17. The method as set forth in claim 16 wherein said metallic substances comprise aluminum.

18. The method as set forth in claim 1 including the further step of conveying said relatively high metallic concentrates to a second pair of roller means having a predetermined spacing and compressing said metallic concentrates between said second pair of roller means by passing the same therebetween so as to form said metallic concentrates into relatively thin, flake-like bodies.

19. The method as set forth in claim 18 wherein said metallic concentrates comprise aluminum.

20. The method as set forth in claim 19 further including the step of impacting said flake-like bodies by a plurality of milling surfaces so as to disassociate said metallic concentrates and non-metallic substances one from the other, and separating said non-metallic substances from said metallic concentrates so that the latter remain as relatively higher metallic concentrates whereby metallic dust-like particles become disassociated from said metallic concentrates and are commingled with said non-metallic substances after separation of the latter from said metallic concentrates.

21. The method as set forth in claim 20 wherein said milling surfaces comprise knife-like surfaces.

22. The method as set forth in claim 20 including separating said relatively higher metallic concentrates and said non-metallic substances from one another by passing the same through an air separator means.

23. The method as set forth in claim 19 including resiliently mounting *the first* said pair of roller means with respect to one another to have a predetermined spacing less than said predetermined size range of said dross particles.

24. The method as set forth in claim 23 further including the step of impacting said flake-like bodies by a plurality of milling surfaces so as to disassociate said metallic concentrates and non-metallic substances one from the other, and separating said non-metallic substances from said metallic concentrates so that the latter remain as relatively higher metallic concentrates whereby metallic dust-like particles become disassociated from said metallic concentrates and are commingled with said non-metallic substances after separation of the latter from said metallic concentrates.

25. The method as set forth in claim 24 wherein said milling surfaces comprise knife-like surfaces.

26. The method as set forth in claim 24 including separating said non-metallic substances from said metallic concentrates by passing both over a screen means.

27. The method as set forth in claim 24 including separating said relatively higher metallic concentrates and said non-metallic substances from one another by passing the same through an air separator means.

28. The method as set forth in claim 23 wherein said dross conveyed to said first pair of roller means comprises particles greater than 1/40 of an inch but less than 1/20 of an inch in greatest dimension.

29. The method as set forth in claim 23 wherein said dross conveyed to said first pair of roller means comprises particles greater than 1/20 of an inch but less than 1/10 of an inch in greatest dimension.

30. The method as set forth in claim 23 wherein said dross conveyed to said first pair of roller means comprises particles greater than 1/10 of an inch less than ¼ of an inch in greatest dimension.

31. The method as set forth in claim 23 wherein said dross conveyed to said first pair of roller means comprises particles greater than ¼ of an inch but less than ½ of an inch in greatest dimension.

32. The method as set forth in claim 23 wherein said dross conveyed to said first pair of roller means comprises particles greater than ½ of an inch but less than 1 inch in greatest dimension.

33. The method as set forth in claim 23 wherein said dross conveyed to said first pair of roller means comprises particles greater than one inch but less than 1½ inches in greatest dimension.

34. The method as set forth in claim 23 wherein said dross conveyed to said first pair of roller means comprises particles greater than 1½ inches but less than 2 inches in greatest dimension.

35. A method of converting irregularly sized chunks of a metallic substance having a predetermined size range into metallic concentrates of a predetermined size range, said method comprising the steps of:

conveying said chunks of metallic substance [of] *to* a pair of roller means having a predetermined spacing, compressing said chunks of metallic substance between said pair of roller means by passing said chunks therebetween so as to form said chunks into relatively thin, flake-like bodies, and converting said flake-like bodies into metallic concentrates by impacting said flake-like bodies with a knife-like surface so as to comminute said flake-like bodies into sliced, metallic particles whereby non-metallic substances and metallic dust-like substances become disassociated from said metallic particles and are commingled with one another.

36. The method as set forth in claim 35 including sequentially impacting said metallic substance after passing through said pair of roller means by a plurality of knife-like surfaces and passing the same over screening means to separate out sliced metallic particles being of a predetermined size or smaller.

37. The method as set forth in claim 35 wherein said metallic substance comprises aluminum.

38. The method as set forth in claim 37 including separating said non-metallic substances from said metallic particles by passing the same through an air separation means.

*39. A method for reclaiming, in relatively high metallic concentrate form, aluminum substances entrained in dross, said method comprising the steps of:*

*conveying said dross to a pair of roller means having a predetermined spacing, said dross comprising particles of a predetermined size range,*

*compressing said dross to a limited degree without substantially crushing the same between said pair of roller means by passing said dross therebetween so as to substantially break the bonds between the metallic and non-metallic substances in said dross, and*

*separating said non-metallic substances from said metallic substances so that relatively concentrated metallic substances remain whereby metallic dust-like particles become disassociated from said metallic substances and are commingled with said non-metallic substances after separation of the latter from said metallic substances.*

*40. A method for reclaiming, in relatively high metallic concentrate form, aluminum substances entrained in dross, said method comprising the steps of:*

*grading said dross into particles of a predetermined size range,*

*conveying said dross to a pair of roller means,*

*resiliently mounting said pair of roller means with respect to one another to have a predetermined spacing less than said predetermined size range of said dross particles,*

*compressing, without substantially crushing, said dross in a resilient manner between said pair of roller means by passing said dross therebetween so as to substantially break the bonds between the metallic and non-metallic substances in said dross,*

*milling said dross after passage thereof through said pair of roller means so as to disassociate said metallic and non-metallic substances one from the other, and*

*separating said non-metallic substances from said metallic substances so that relatively high metallic concentrates remain whereby metallic dust-like particles become disassociated from said metallic substances and are commingled with said non-metallic substances after separation of the latter from said metallic substances.*

*41. A method for reclaiming, in relatively high metallic concentrate form, aluminum substances entrained in dross, said method comprising the steps of:*

*grading said dross into particles of a predetermined size range,*

*conveying said dross to a pair of roller means,*

*resiliently mounting said pair of roller means with respect to one another to have a predetermined spacing less than said predetermined size range of said dross particles,*

*compressing, without substantially crushing, said dross in a resilient manner between said pair of roller means by passing said dross therebetween so as to substantially break the bonds between the metallic and non-metallic substances in said dross, and*

*separating said non-metallic substances from said metallic substances so that relatively high metallic concentrates remain whereby metallic dust-like particles become disassociated from said metallic substances and are commingled with said non-metallic substances after separation of the latter from said metallic substances.*

*42. A method for reclaiming, in relatively high metallic concentrate form, aluminum substances entrained in dross, said method comprising the steps of:*

*grading said dross into particles of a predetermined size range,*

*conveying said dross to a pair of roller means,*

*resiliently mounting said pair of roller means with respect to one another to have a predetermined spacing less than said predetermined size range of said dross particles,*

*passing said dross between said pair of roller means to cause said roller means to yield and separate one from the other and exert a resilient compressive force on said dross particles without substantially crushing said dross particles so as to substantially break the bonds between the metallic and non-metallic substances in at least a substantial quantity of said dross particles, and*

*separating said non-metallic substances from said metallic substances so that relatively high metallic concentrates remain.*

*43. A method for reclaiming, in relatively high metallic concentrate form, aluminum substances entrained in dross, said method comprising the steps of:*

*grading said dross into particles of a predetermined size range,*

*conveying said dross to a pair of roller means that are resiliently mounted with respect to one another, said roller means having a predetermined spacing less than said predetermined size range of said dross particles,*

*passing said dross between said pair of roller means to exert a resilient compressive force on said dross particles without substantially crushing said dross particles so as to substantially break the bonds between the metallic and non-metallic substances in at least a substantial quantity of said dross particles, and*

*mechanically working said dross particles to cause said non-metallic substances to separate from said metallic substances so that relatively high metallic concentrates are obtained.*

* * * * *